United States Patent
Yamarthi et al.

(10) Patent No.: US 12,258,909 B2
(45) Date of Patent: Mar. 25, 2025

(54) GEARBOX ASSEMBLY

(71) Applicant: General Electric Company, Schenectady, NY (US)

(72) Inventors: David Yamarthi, Bengaluru (IN); Paul Mathew, Bengaluru (IN); Parmeet Chhabra, Bengaluru (IN); Ravindra Shankar Ganiger, Bengaluru (IN); Souvik Porel, Bengaluru (IN); Gautam Naik, Bengaluru (IN); Norman A. Turnquist, Sloansville, NY (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 77 days.

(21) Appl. No.: 17/813,677

(22) Filed: Jul. 20, 2022

(65) Prior Publication Data

US 2023/0272751 A1    Aug. 31, 2023

(30) Foreign Application Priority Data

Feb. 25, 2022    (IN) .............................. 202211010222

(51) Int. Cl.
  *F02C 7/36*   (2006.01)
  *F01D 25/18*  (2006.01)
  *F02C 7/06*   (2006.01)

(52) U.S. Cl.
  CPC ................ *F02C 7/36* (2013.01); *F01D 25/18* (2013.01); *F02C 7/06* (2013.01);
  (Continued)

(58) Field of Classification Search
  CPC ............. F02C 7/36; F05D 2260/40311; F05D 2260/98; F05D 2300/612; F01D 25/182;
  (Continued)

(56) References Cited

U.S. PATENT DOCUMENTS

| 2,322,247 A | 6/1943 | Mercier |
| 2,704,465 A * | 3/1955 | Haller ................. F16H 57/0406 |
| | | 74/567 |

(Continued)

FOREIGN PATENT DOCUMENTS

| CN | 105805273 A * | 7/2016 | |
| CN | 108361350 A * | 8/2018 | ............. F16H 55/17 |

(Continued)

OTHER PUBLICATIONS

Yanling Ma et al., "Forming of hollow gear-shafts with pressure-assisted injection forging (PAIF)", Journal of Materials Processing Technology, 167, 2005, pp. 294-301.

(Continued)

*Primary Examiner* — Woody A Lee, Jr.
*Assistant Examiner* — Jesse M Prager
(74) *Attorney, Agent, or Firm* — Venable LLP; Michele V. Frank

(57) ABSTRACT

A gearbox assembly for a gas turbine engine includes a hollow gear. The hollow gear has one or more reservoirs configured to store a lubricant and one or more passages configured to supply the lubricant to one or more gear meshes in the gearbox assembly. The hollow gear provides a dampening system configured to absorb vibrations and loading experienced in the gearbox assembly and configured to provide impact resistance for the gearbox assembly.

16 Claims, 10 Drawing Sheets

(52) U.S. Cl.
CPC .. *F05D 2250/291* (2013.01); *F05D 2260/232* (2013.01); *F05D 2260/40311* (2013.01); *F05D 2260/96* (2013.01); *F05D 2260/98* (2013.01); *F05D 2300/612* (2013.01)

(58) Field of Classification Search
CPC .... F01D 25/18; F16H 57/043; F16H 57/0431; F16H 55/14; F16H 2055/176; F16H 57/0006; F16H 57/046; F16H 57/0486
See application file for complete search history.

(56) References Cited

U.S. PATENT DOCUMENTS

| | | | |
|---|---|---|---|
| 2,961,970 | A | 11/1960 | Murray et al. |
| 8,517,672 | B2 | 8/2013 | McCooey |
| 9,772,020 | B2 | 9/2017 | Maruyama |
| 10,119,465 | B2 * | 11/2018 | Sheridan ............... F16H 1/2818 |
| 10,670,132 | B2 | 6/2020 | McCune |
| 10,781,755 | B2 | 9/2020 | McCune |
| 10,794,470 | B2 | 10/2020 | Uhkoetter et al. |
| 11,105,396 | B2 | 8/2021 | Goumas |

FOREIGN PATENT DOCUMENTS

| | | | | |
|---|---|---|---|---|
| CN | 112283319 | A * | 1/2021 | ............. F16H 55/17 |
| DE | 102011122395 | A1 | 7/2012 | |
| EP | 3477158 | A1 * | 5/2019 | |
| FR | 3127024 | A1 | 3/2023 | |
| FR | 3127025 | A1 | 3/2023 | |
| FR | 3129436 | A1 | 5/2023 | |
| FR | 3129690 | A1 | 6/2023 | |
| FR | 3130747 | A1 | 6/2023 | |
| FR | 3130875 | A1 | 6/2023 | |
| JP | 2007120616 | A | | 5/2007 |

OTHER PUBLICATIONS

Bandar Alzahrani et al., "Preliminary Investigation of the Process Capabilities of Hydroforging", Materials, 2016.
Joakim Lundqvist "Numerical Simulation of Tube Hydroforming Adaptive Loading Paths", Licentiate Thesis, 2004.

* cited by examiner

GEARBOX ASSEMBLY

CROSS REFERENCE TO RELATED APPLICATIONS

The present application claims the benefit of Indian patent application No. 202211010222, filed on Feb. 25, 2022, which is hereby incorporated by reference herein in its entirety.

TECHNICAL FIELD

The present disclosure relates to a gearbox assembly.

BACKGROUND

A gas turbine engines includes a fan driven by a turbine. A gearbox assembly is coupled between the fan and the turbine. The gearbox assembly provides a speed decrease between the turbine and the fan. Lubrication is supplied to a gear mesh between relative rotating gears of the gearbox assembly.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

DETAILED DESCRIPTION

Features, advantages, and embodiments of the present disclosure are set forth or apparent from a consideration of the following detailed description, drawings, and claims. Moreover, it is to be understood that the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

The gearbox assemblies of the present disclosure are provided with hollow gears. The hollow gears may be gears with internal reservoirs and flexible interconnecting members or struts. The hollow gears may be formed by electro-forming or hydroforming techniques. The internal reservoirs serve to provide a cavity for lubrication, to make the gears compliant and/or flexible, and to provide a light weight gearbox. The hollow gears of the present disclosure may provide emergency lubrication to one or more gear meshes of the gearbox assembly, may be lightweight, may provide dampening to the gearbox assembly, and may accommodate misalignment among the gears.

Figure 1:
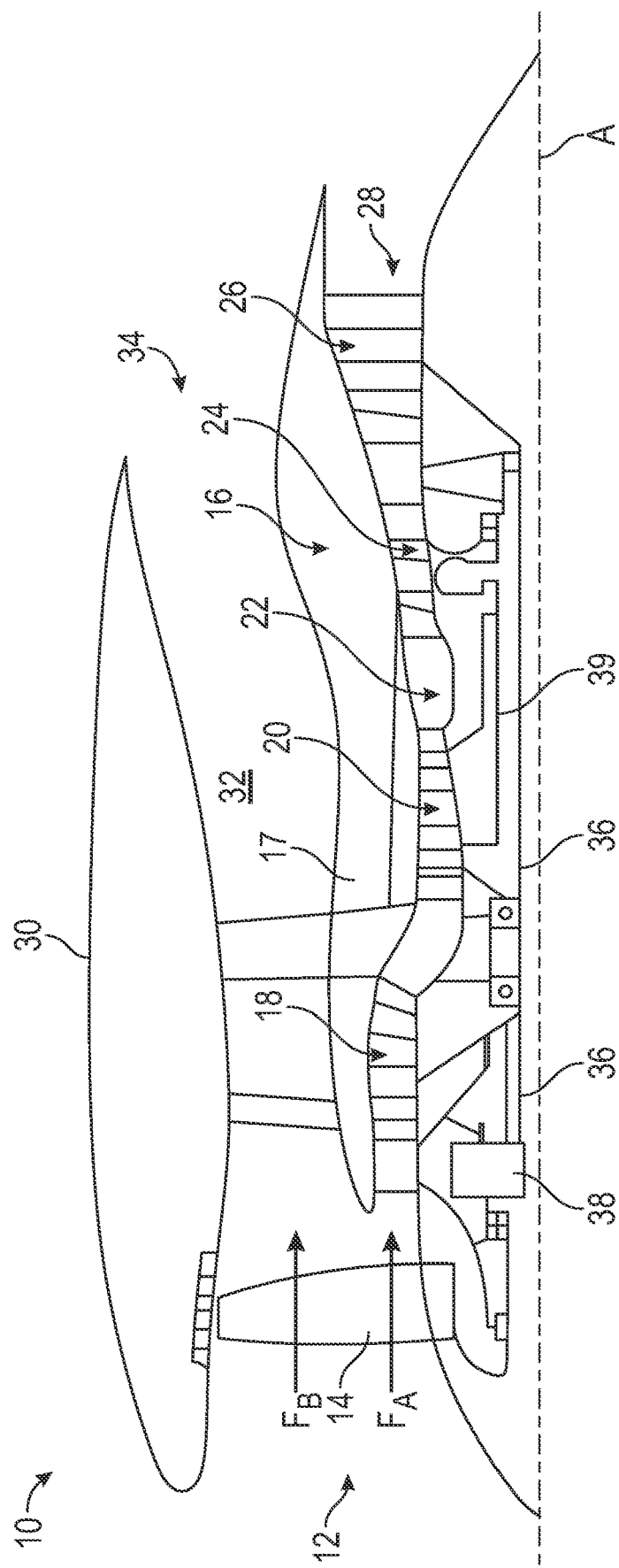
FIG. 1 shows a schematic, cross-sectional view of a gas turbine engine, taken along a centerline of the gas turbine engine, according to an embodiment of the present disclosure.

FIG. 1 shows a schematic cross-sectional view of a gas turbine engine 10 taken along a center axis A that is a principal rotational axis. The gas turbine engine 10 comprises an air intake 12 and a fan 14 that generates two airflows: a core airflow FA and a bypass airflow FB. The gas turbine engine 10 comprises an engine core 16 that receives the core airflow FA. The engine core 16 comprises a housing 17 that encircles, in axial flow series, a low-pressure compressor 18, a high-pressure compressor 20, a combustion section 22, a high-pressure turbine 24, a low-pressure turbine 26, and a core exhaust nozzle 28. A nacelle 30 surrounds the gas turbine engine 10. The nacelle 30 defines a bypass duct 32 and a bypass exhaust nozzle 34. The bypass airflow FB flows through the bypass duct 32. The fan 14 is attached to and driven by the low-pressure turbine 26 via a low-pressure shaft 36 and a gearbox assembly 38.

In use, the core airflow FA is accelerated and compressed by the low-pressure compressor 18 and directed into the high-pressure compressor 20 where further compression takes place. The compressed air exhausted from the high-pressure compressor 20 is directed into the combustion section 22 where it is mixed with fuel and the mixture is combusted. The resultant hot combustion products then expand through, and thereby drive, the high-pressure turbine 24 and the low-pressure turbine 26 before being exhausted through the core exhaust nozzle 28. This provides propulsive thrust. The high-pressure turbine 24 drives the high-pressure compressor 20 by a high-pressure shaft 39. The fan 14 generally provides the majority of the propulsive thrust. The gearbox assembly 38 is a reduction gearbox.

Figure 2:
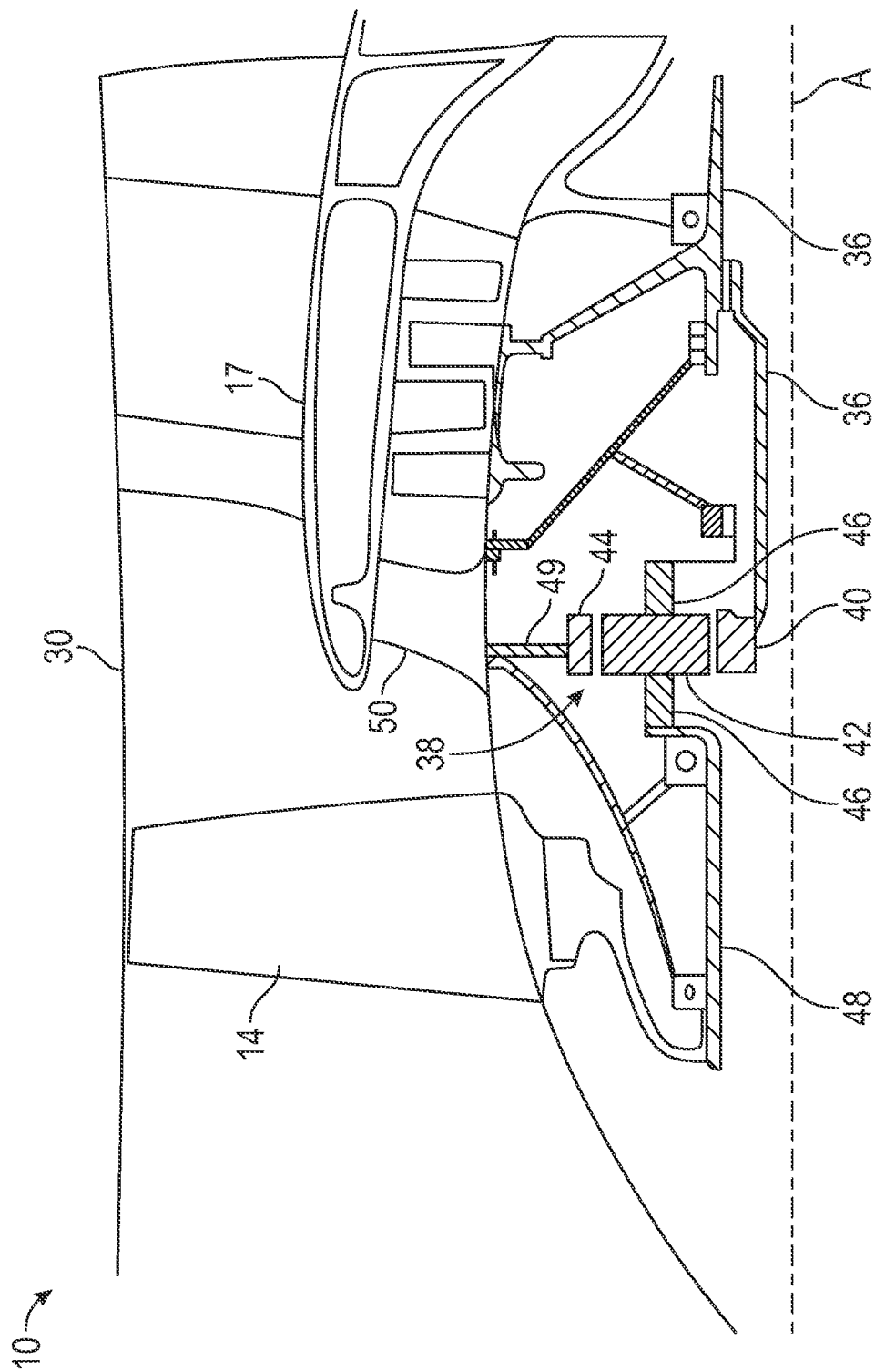
FIG. 2 shows a partial schematic, cross-sectional view of the gas turbine engine of FIG. 1, according to an embodiment of the present disclosure.
Figure 3:
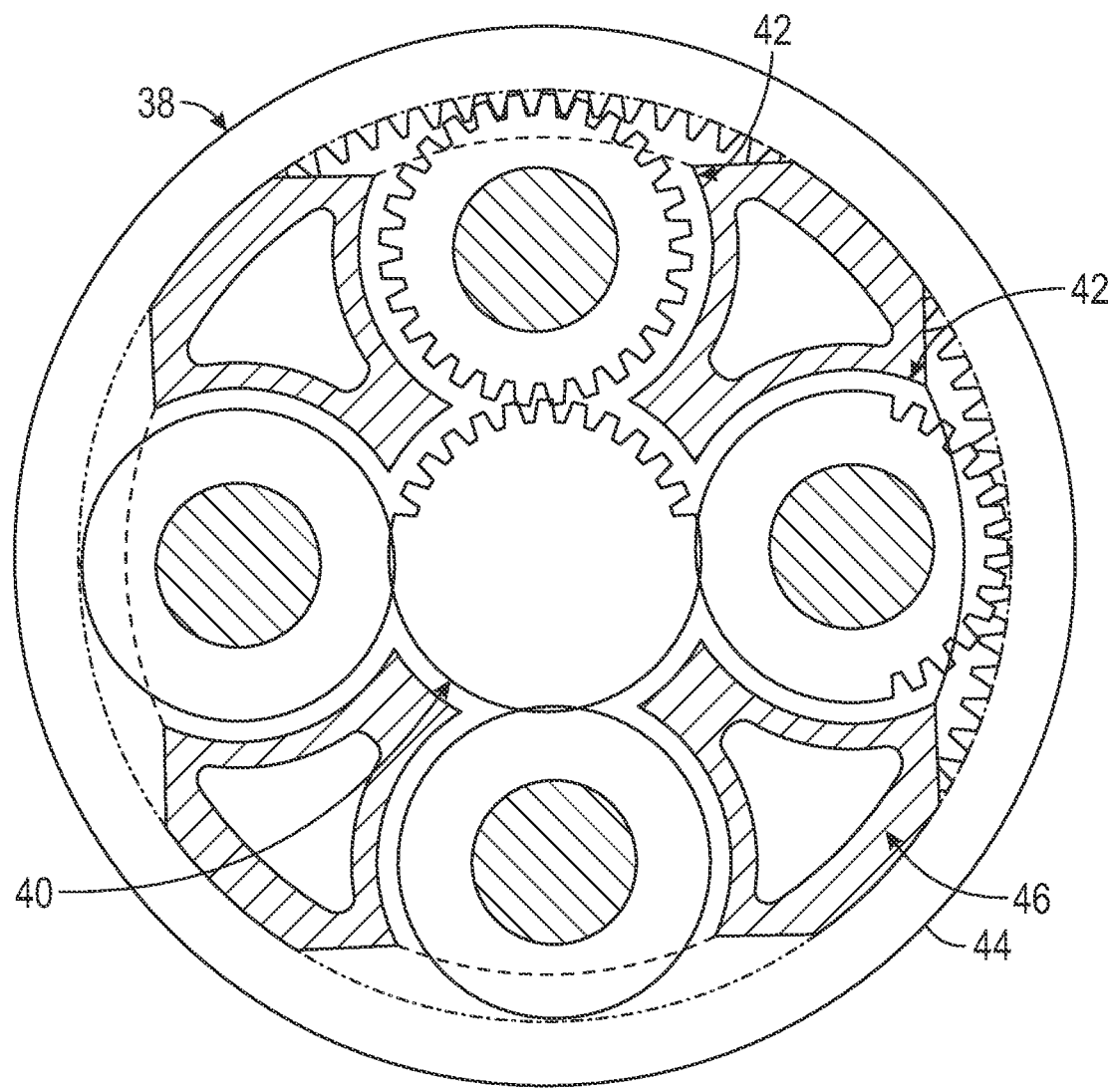
FIG. 3 shows a schematic, cross-sectional end view of a gearbox assembly for a gas turbine engine, according to an embodiment of the present disclosure.

FIG. 2 shows an enlarged, schematic side view of the gas turbine engine 10 of FIG. 1 showing the details of the gearbox assembly 38. FIG. 3 shows a schematic axial end cross-sectional view of the gearbox assembly 38. The gearbox assembly 38 includes a sun gear 40, a plurality of planet gears 42, and a ring gear 44. The low-pressure turbine 26 (FIG. 1) drives the low-pressure shaft 36, which is coupled to the sun gear 40 of the gearbox assembly 38. Radially outwardly of the sun gear 40, and intermeshing therewith, is the plurality of planet gears 42 that are coupled together by a planet carrier 46. The planet carrier 46 constrains the plurality of planet gears 42 to rotate around the sun gear 40 in synchronicity while enabling each planet gear of the plurality of planet gears 42 to rotate about its own axis. The planet carrier 46 is coupled via fan rotor linkages 48 to the fan 14 in order to drive rotation of the fan 14 about the axis A and within the nacelle 30. Radially outwardly of the plurality of planet gears 42, and intermeshing therewith, is the ring gear 44, which is an annular ring gear 44. The ring gear 44 is coupled, via linkages 49, to a stationary support structure 50. The stationary support structure 50 connects the gearbox assembly 38 to the housing 17.

Although not depicted in FIG. 2 and shown only partially in FIG. 3 for clarity, each of the sun gear 40, the plurality of planet gears 42, and the ring gear 44 comprises teeth about their periphery to intermesh with the other gears. The gearbox assembly 38 of FIGS. 2 and 3 is illustrated as a planetary type gearbox, in that the planet carrier 46 is coupled to an output shaft via fan rotor linkages 48, with the ring gear 44 being fixed. However, other suitable type of gearbox assembly 38 may be employed. In one non-limiting example, the gearbox assembly 38 may be a star arrangement, in which the planet carrier 46 is held fixed, with the ring gear 44 allowed to rotate. In such an arrangement, the fan 14 is driven by the ring gear 44. In another non-limiting example, the gearbox assembly 38 may be a differential gearbox in which the ring gear 44 and the planet carrier 46 are both allowed to rotate.

Figure 4:
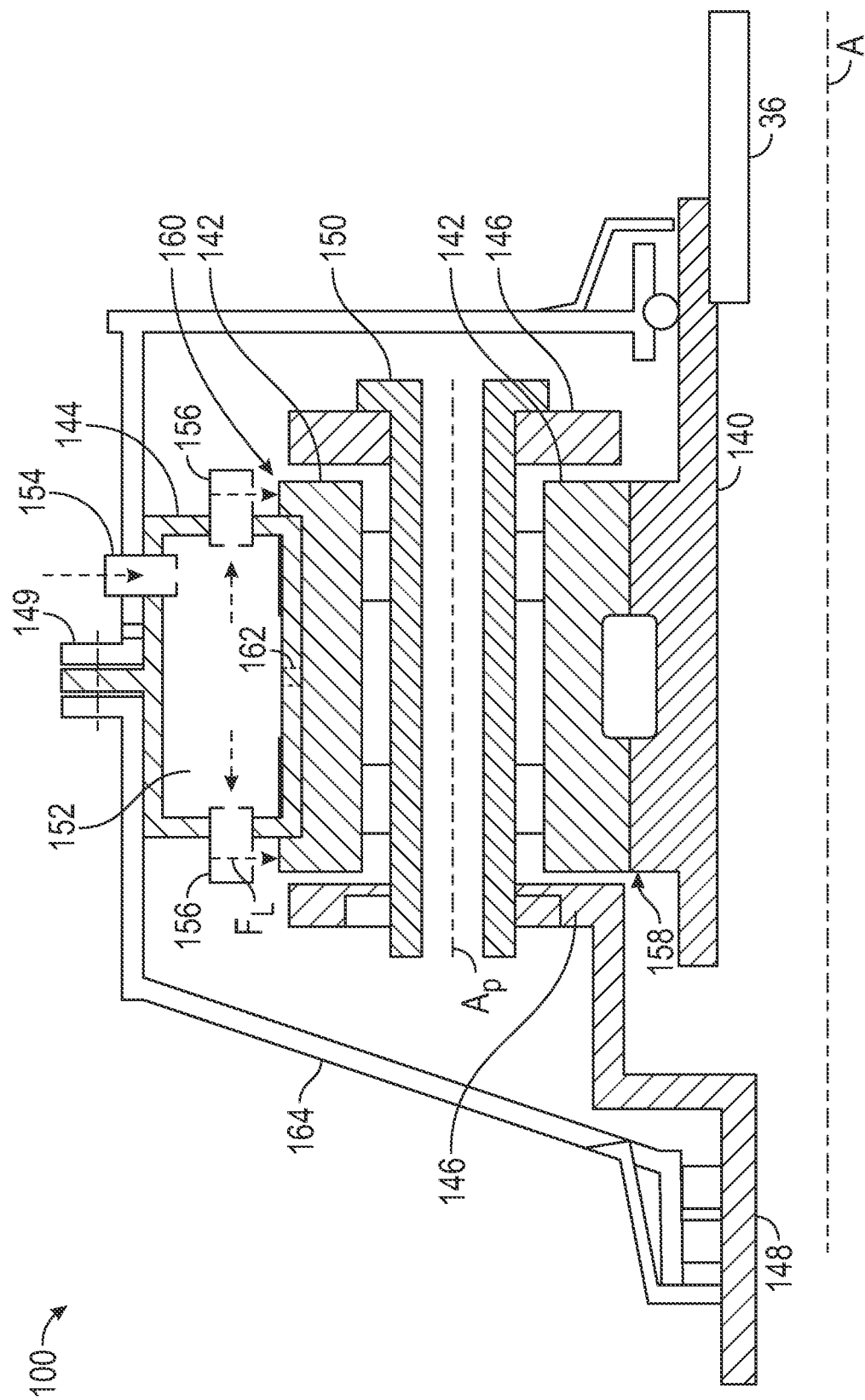
FIG. 4 shows a schematic, side view of a gearbox assembly for a gas turbine engine, according to an embodiment of the present disclosure.

FIG. 4 shows a schematic, cross-sectional view of an exemplary gearbox assembly 100. The gearbox assembly 100 may be employed as the gearbox assembly 38 of FIGS. 1 to 3. That is, the gearbox assembly 100 may couple the low-pressure shaft 36 to the fan 14 (FIG. 1). The gearbox assembly 100 includes a sun gear 140, a plurality of planet gears 142 (only one of which is visible in FIG. 4), and a ring gear 144. A housing 164 may enclose the gearbox assembly 100. For clarity, only a portion of the gears is shown. The structure of the gears may, however, be similar to, or the same as, shown and described with respect to FIG. 3. The gearbox assembly 100 is of a fixed ring gear type (e.g., the ring gear 144 is stationary and fixed, while a planet carrier 146 and the plurality of planet gears 142 are rotating). The planet carrier 146 constrains the plurality of planet gears 142 to rotate around the sun gear 140 in synchronicity while enabling each planet gear of the plurality of planet gears 142 to rotate about its own axis Ap. The planet carrier 146 is coupled via rotor linkages 148 to the fan 14 (FIG. 2) and rotates with the plurality of planet gears 142 in order to drive rotation of the fan 14 (FIG. 2) about the axis A. Radially outwardly of the plurality of planet gears 142, and intermeshing therewith, is the ring gear 144, which is connected via linkages 149 to a stationary support structure 50 (FIG. 2). In the example of FIG. 4, the ring gear 144 is stationary and fixed to the linkages 149. Each of the planet gears of the plurality of planet gears 142 includes a pin 150 about which a respective planet gear rotates.

The ring gear 144 of the gearbox assembly 100 includes a cavity or a reservoir 152 such that the ring gear 144 is a hollow ring gear 144. The reservoir 152 may have one or more openings or passages 154 that allow a fluid to enter the reservoir 152. The reservoir 152 may have one or more openings or passages 156 that allow a fluid to exit the reservoir 152 in an axial direction and one or more openings or passages 162 that allow fluid to exit the reservoir 152 in a radial direction. The fluid may be a lubricant, such as, for example, but not limited to, oil and/or grease. Although depicted as separate components, tubes, or passages, the passages 154, the passages 156, and/or the passages 162 may take other forms, such as being integrally formed passages or openings, as will be described herein.

The lubricant from the reservoir 152 may be fed to one or more of the gears, for example, to the sun gear 140, to one or more of the plurality of planet gears 142, to the ring gear 144, or any combination thereof via one or more of the one or more passages 156 and/or the one or more passages 162. For example, the lubricant may drip from the reservoir 152 to the gear teeth of the plurality of planet gears 142 via the one or more passages 156 and/or the one or more passages 162. This lubricates a gear mesh 160 between the plurality of planet gears 142 and the ring gear 144, and, in turn, lubricates a gear mesh 158 between the plurality of planet gears 142 and the sun gear 140. In some examples, the lubricant may be fed through the passage 162 to the gear mesh between the plurality of planet gears 142 and the ring gear 144. In some examples, the passage 162 and/or one or more of the passages 156 may be omitted.

During operation of the gearbox assembly 100, the lubricant is provided to the gears from a radially outer position of the gearbox assembly 100 toward a radially inward position of the gearbox assembly 100. That is, the lubricant may be fed through the hollow ring gear 144 (e.g., a radially outer position) and drip onto the plurality of planet gears 142 to provide lubrication thereto, which, in turn, lubricates the gear mesh 158 and the gear mesh 160 (e.g., radially inner positions). A continuous supply of lubricant may be provided through the gearbox assembly 100 to the gear mesh 158 and the gear mesh 160. This provides continuous lubrication to the gear mesh 158 and the gear mesh 160. Furthermore, the fluid in the reservoir 152 may provide dampening of vibrations within the gearbox assembly 100. The fluid in the reservoir 152 may dampen the rotation of the plurality of planet gears 142 with respect to the ring gear 144.

Therefore, the fluid or lubricant within the reservoir 152 of the hollow ring gear 144 provides a dampening system that absorbs vibrations and loading experienced in the gearbox assembly 100 and provides impact resistance due to loading on the gears of the gearbox assembly 100. As discussed with respect to FIGS. 7 to 9, the structure of the ring gear 144 may also provide impact resistance and impact absorption for loads experienced on the ring gear 144. Additionally, the fluid or lubricant within the reservoir 152 may act to cool the ring gear 144. That is, rotation of the gears relative to one another and relative to other components in rotational contact causes the gears to be heated. The lubricant or fluid within the reservoir 152 may absorb the heat (e.g., acting as a heat sink) of the gear, thereby cooling the ring gear 144.

Figure 5:
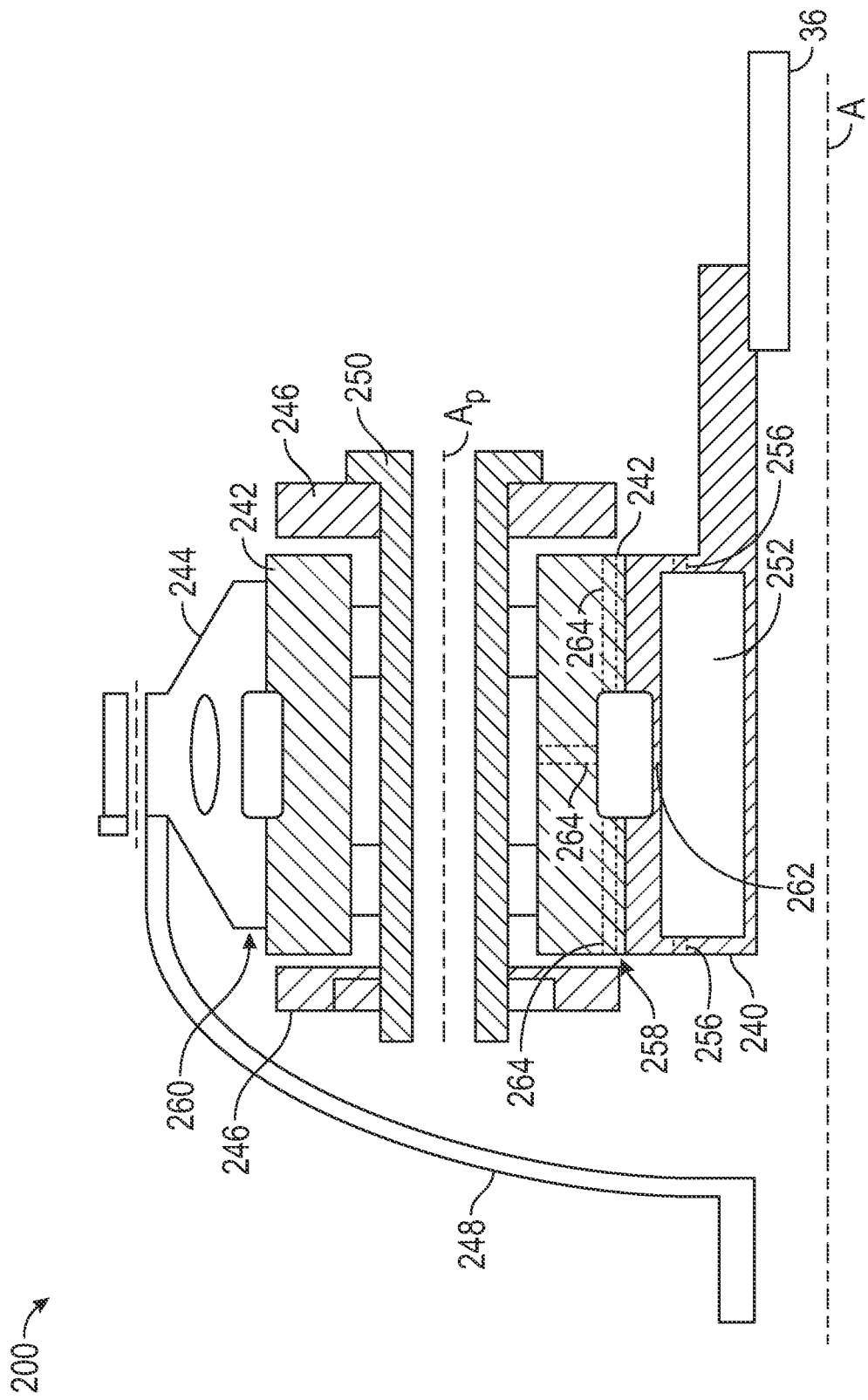
FIG. 5 shows a schematic, side view of a gearbox assembly for a gas turbine engine, according to an embodiment of the present disclosure.

FIG. 5 shows a schematic, cross-sectional view of an exemplary gearbox assembly 200. The gearbox assembly 200 may be employed as the gearbox assembly 38 of FIGS. 1 to 3. That is, the gearbox assembly 200 may couple the low-pressure shaft 36 to the fan 14 (FIG. 1). The gearbox assembly 200 includes a sun gear 240, a plurality of planet gears 242 (only one of which is visible in FIG. 5), and a ring gear 244. For clarity, only a portion of the gears is shown. The structure of the gears may, however, be similar to, or the same as, shown and described with respect to FIG. 3. The gearbox assembly 200 is a star type or rotating ring gear type gearbox assembly (e.g., the ring gear 244 is rotating and a planet carrier 246 is fixed and stationary). The planet carrier 246 constrains the plurality of planet gears 242 such that the plurality of planet gears 242 do not together rotate around the sun gear 240 while enabling each planet gear of the plurality of planet gears 242 to rotate about its own axis Ap. The ring gear 244 is coupled via rotor linkages 248 to the fan 14 (FIG. 2) and rotates to drive rotation of the fan 14 (FIG. 2) about the axis A. Radially inward of the ring gear 244, and intermeshing therewith, is the plurality of planet gears 242. Each of the planet gears of the plurality of planet gears 242 includes a pin 250 about which a respective planet gear rotates.

The sun gear 240 of the gearbox assembly 200 includes a cavity or a reservoir 252 such that the sun gear 240 is a hollow sun gear 240. The reservoir 252 may have one or more passages or openings (not shown) that allow a fluid to enter the reservoir 252, which may be similar to, or the same as, the one or passages 154 described with respect to FIG. 4. The reservoir 252 may have one or more openings or passages 256 that allow a fluid to exit the reservoir 252 in an axial direction and/or one or more openings or passages 262 that allow fluid to exit the reservoir 252 in a radial direction. The fluid may be a lubricant, such as, for example, but not limited to, oil and/or grease. Although depicted as separate components, tubes, or passages, the inlet openings (not shown), the passages 256, and/or the passages 262 may take other forms, such as being integrally formed passages or openings, as will be described herein.

The lubricant from the reservoir 252 may be fed to one or more of the gears, for example, to the sun gear 240, to one or more of the plurality of planet gears 242, to the ring gear 244, or any combination thereof via one or more of the one or more passages 256 and/or the one or more passages 262. For example, the lubricant may drip from the reservoir 252 to the gear teeth of the plurality of planet gears 242 and the sun gear 240. This lubricates a gear mesh 258 between the plurality of planet gears 242 and the sun gear 240. The gear mesh 258 may be the space between the gear teeth of the sun gear 240 and the plurality of planet gears 242, shown in FIG. 5 are two exemplary gear teeth and space between the gear teeth (e.g., the space into which the passage 262 is shown to enter). Lubrication of the gear mesh 258 in turn, lubricates a gear mesh 260 between the plurality of planet gears 142 and the ring gear 244. That is, the plurality of planet gears 242 may transfer (e.g., due to rotation of the planet gears) the lubricant to the gear mesh 260 between the plurality of planet gears 242 and the ring gear 244. In some examples, the passages 262 and/or one or more of the passages 256 may be omitted.

In some examples, the one or more passages 256 may be employed to supply and/or fill the reservoir 252 with lubricant. In these examples, the one or more passages 256 may be sealed once lubricant is filled in the reservoir 252 in order to avoid lubricant loss from the reservoir 252. The seal may be selectively opened and closed such that the one or more passages 256 may be filled a plurality of times.

The lubricant may be fed through a passage 264 to the pin 250 of each of the plurality of planet gears 242. The passage may extend radially, axially, or both a radial and axial passage may be included. In some examples, the passage 264 may be omitted. Although not shown or described with respect to the gear assembly 100 of FIG. 4 and/or the gear assembly 300 of FIG. 6, a similar passage to the pins may be included.

During operation of the gearbox assembly 200, the lubricant is provided to the gears from a radially inner position of the gearbox assembly 200 toward a radially outward position of the gearbox assembly 200. That is, the lubricant may be fed through the hollow sun gear 240 (e.g., a radially inner position) and drip onto the plurality of planet gears 242 to provide lubrication thereto, which, in turn, lubricates the gear mesh 258 and the gear mesh 260 (e.g., radially outward position). A continuous supply of lubricant may be provided through the gearbox assembly 200 to the gear mesh 258 and the gear mesh 260. This provides continuous lubrication to the gear mesh 258 and the gear mesh 260. Furthermore, the fluid in the reservoir 252 may provide dampening impact resistance within the gearbox assembly 200. The fluid in the reservoir 252 may dampen the impact of the rotation of the plurality of planet gears 242 and ring gear 244.

Therefore, the fluid or lubricant within the reservoir 252 of the hollow sun gear 240 provides a dampening system that absorbs vibrations and loading experienced in the gearbox assembly 200 and provides impact resistance due to loading on the gears of the gearbox assembly 200. As discussed with respect to FIGS. 7 to 9, the structure of the sun gear 240 provides impact resistance and impact absorption for loads experienced on the sun gear 240. Additionally, the fluid or lubricant within the reservoir 252 acts to cool the sun gear 240. That is, rotation of the gears relative to one another and relative to other components in rotational contact causes the gears to be heated. The lubricant or fluid within the reservoir 252 absorbs the heat (e.g., acting as a heat sink) of the gear, thereby cooling the sun gear 240.

In some examples, the reservoir 252 may be a standby reservoir, such that, the passages 256 and/or the passage 262 may be selectively opened based on a predetermined condition. When the passages 256 and/or the passage 262 is opened, lubricant may be supplied to the gear mesh 258 and, in turn, the gear mesh 260. The predetermined condition could be an operating condition of the engine, temperature, load, etc. In the example when passages 256 and/or passage 262 is selectively opened and closed based on a predetermined condition, the lubricant may be continuously supplied only when the passages 256 and/or the passage 262 are open.

Figure 6:
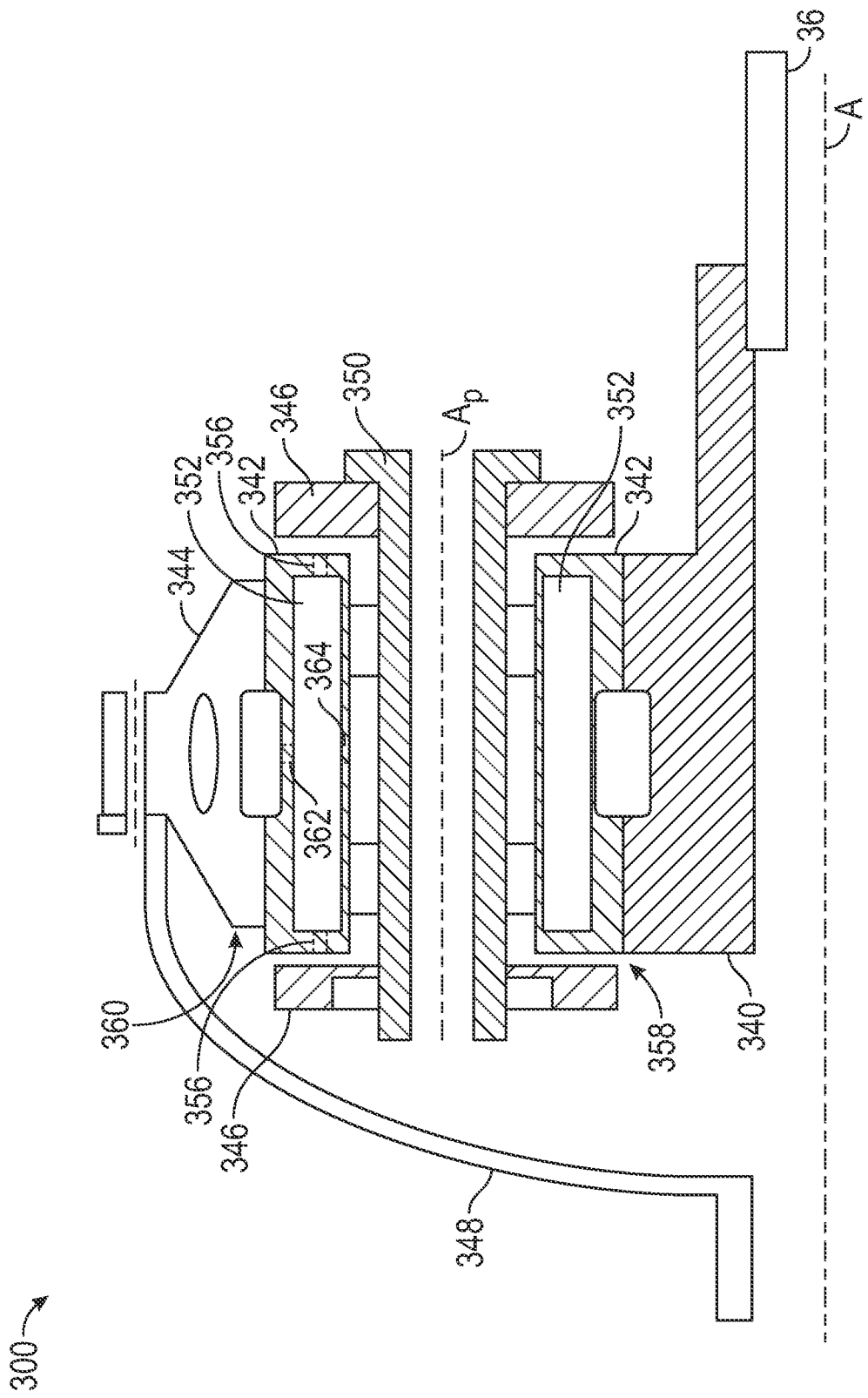
FIG. 6 shows a schematic, side view of a gearbox assembly for a gas turbine engine, according to an embodiment of the present disclosure.

FIG. 6 shows a schematic, cross-sectional view of an exemplary gearbox assembly 300. The gearbox assembly 300 may be employed as the gearbox assembly 38 of FIGS. 1 to 3. That is, the gearbox assembly 300 may couple the low-pressure shaft 36 to the fan 14 (FIG. 1). The gearbox assembly 300 includes a sun gear 340, a plurality of planet gears 342 (only one of which is visible in FIG. 6), and a ring gear 344. For clarity, only a portion of the gears is shown. The structure of the gears may, however, be similar to, or the same as, shown and described with respect to FIG. 3. The gearbox assembly 300 is a star type or a rotating ring gear type gearbox assembly (e.g., the ring gear 344 is rotating and a planet carrier 346 is fixed and stationary). The planet carrier 346 constrains the plurality of planet gears 342 such that the plurality of planet gears 342 do not together rotate around the sun gear 340 while enabling each planet gear of the plurality of planet gears 342 to rotate about its own axis Ap. The ring gear 344 is coupled via rotor linkages 348 to the fan 14 (FIG. 2) to drive rotation of the fan 14 (FIG. 2) about the axis A. Radially inward of the ring gear 344, and intermeshing therewith, is the plurality of planet gears 342.

Each of the planet gears of the plurality of planet gears 342 includes a pin 350 about which a respective planet gear rotates.

Each planet gear of the plurality of planet gears 342 of the gearbox assembly 300 includes a cavity 352, also referred to as a reservoir 352 such that each planet gear of the plurality of planet gears 342 is a hollow planet gear 342. The reservoir 352 shown in FIG. 6 may be an annular reservoir extending circumferentially about the axis Ap. The reservoir 352 may have one or more passages or openings (not shown) that allow a fluid to enter the reservoir 352, which may be similar to, or the same as, the one or more passages 154 described with respect to FIG. 4. The reservoir 352 may have one or more openings or passages 356 that allow a fluid to exit the reservoir 352 in an axial direction and/or one or more openings or passages 362 that allow fluid to exit the reservoir 352 in a radial direction. The fluid may be a lubricant, such as, for example, but not limited to, oil and/or grease. Although depicted as separate components, tubes, or passages, the inlet openings (not shown), the passages 356, and/or the passages 362 may take other forms, such as being integrally formed passages or openings, as will be described herein.

The lubricant from the reservoir 352 may be fed to one or more of the gears, for example, to the sun gear 340, to one or more of the plurality of planet gears 342, to the ring gear 344, or any combination thereof via one or more of the one or more passages 356 and/or the passage 362. For example, the lubricant may drip from the reservoir 352 to the gear teeth of the plurality of planet gears 342 and the ring gear 344. This lubricates a gear mesh 360 between the plurality of planet gears 342 and the ring gear 344. The plurality of planet gears 342 may then transfer (e.g., due to rotation of the planet gears) the lubricant to a gear mesh 358 between the plurality of planet gears 342 and the sun gear 340. The lubricant may be fed through a passage 364 to the pin 350 of each of the plurality of planet gears 342. In some examples, the passage 362, the passage 364 and/or the passages 356 may be omitted.

In some examples, the one or more passages 356 may be employed to supply and/or fill the reservoir 352 with lubricant. In these examples, the one or more passages 356 may be sealed once lubricant is filled in the reservoir 352 in order to avoid lubricant loss from the reservoir 352. The seal may be selectively opened and closed such that the one or more passages 356 may be filled a plurality of times.

During operation of the gearbox assembly 300, the lubricant may be fed through the hollow planet gears 342 and drip onto the plurality of planet gears 342 to provide lubrication thereto, which, in turn, lubricates the gear mesh 360 and, then, the gear mesh 358. Thus, the gearbox assembly 300 provides lubrication in both a radially outward direction (toward gear mesh 360) and a radially inner direction (toward gear mesh 358). A continuous supply of lubricant may be provided through the gearbox assembly 300 to the gear mesh 358 and the gear mesh 360. This provides continuous lubrication to the gear mesh 358 and the gear mesh 360. Furthermore, the fluid in the reservoir 352 may provide dampening impact resistance within the gearbox assembly 300. The fluid in the reservoir 352 may dampen the impact of the rotation of the plurality of the planet gears 342 and the ring gear 344.

Therefore, the fluid or lubricant within the reservoirs 352 of the hollow planet gears 342 provide a dampening system that absorbs vibrations and loading experienced in the gearbox assembly 300 and provides impact resistance due to loading on the gears of the gearbox assembly 300. As discussed with respect to FIGS. 7 to 9, the structure of the planet gears 342 also provides impact resistance and impact absorption for loads experienced on the planet gears 342. Additionally, the fluid or lubricant within the reservoir 352 acts to cool the planet gears 342. That is, rotation of the gears relative to one another and relative to other components in rotational contact causes the gears to be heated. The lubricant or fluid within the reservoir 352 absorbs the heat (e.g., acting as a heat sink) of the gear, thereby cooling the planet gears 342.

In some examples, the reservoir 352 may be a standby reservoir, such that, the passages 356 and/or the passage 362 may be selectively opened based on a predetermined condition. When the passages 356 and/or passage 362 is opened, lubricant may be supplied to the gear mesh 360 and, in turn, the gear mesh 358. The predetermined condition could be an operating condition of the engine, temperature, load, etc. In the example when passages 356 and/or the passage 362 is selectively opened and closed based on a predetermined condition, the lubricant may be continuously supplied only when the passages 356 and/or the passage 362 is open.

Although each of the gearbox assembly 100, the gearbox assembly 200, and the gearbox assembly 300 illustrates a single hollow gear (e.g., ring gear 144, sun gear 240, and/or planet gears 342), other gears of the gearbox assemblies may be hollow gears. In this manner, more than one lubricant reservoir may be present in the gearbox assemblies. The passages into and out of the reservoirs may be circumferentially, radially, and/or axially aligned.

Figure 7:
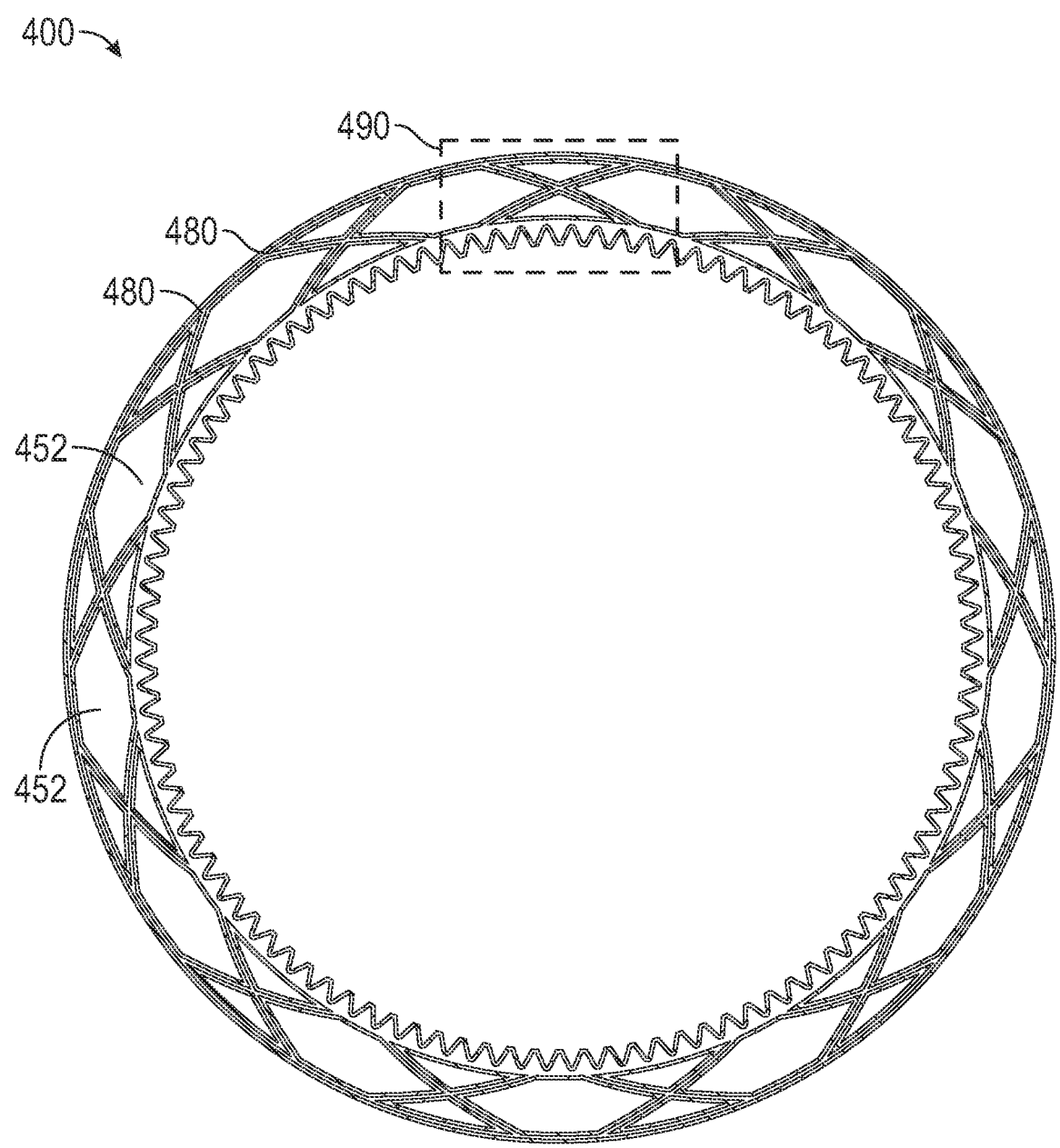
FIG. 7 shows a schematic, end view of a hollow gear for a gearbox assembly for a gas turbine engine, according to an embodiment of the present disclosure.
Figure 8A:
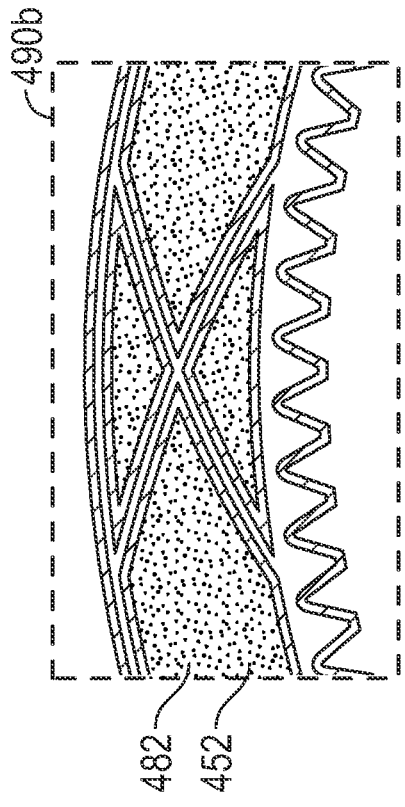
FIG. 8A shows an enlarged, cross-sectional end view of a portion of a hollow gear, according to an embodiment of the present disclosure.
Figure 8C:
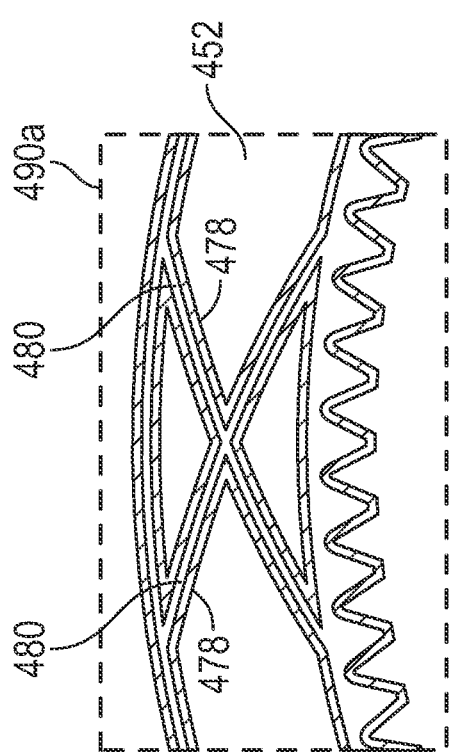
FIG. 8C shows an enlarged, cross-sectional end view of a portion of a hollow gear, according to an embodiment of the present disclosure.
Figure 8B:
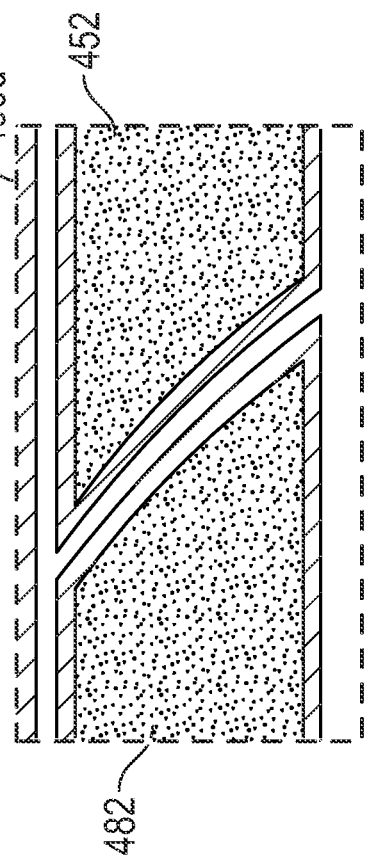
FIG. 8B shows an enlarged, cross-sectional end view of a portion of a hollow gear, according to an embodiment of the present disclosure.
Figure 8D:
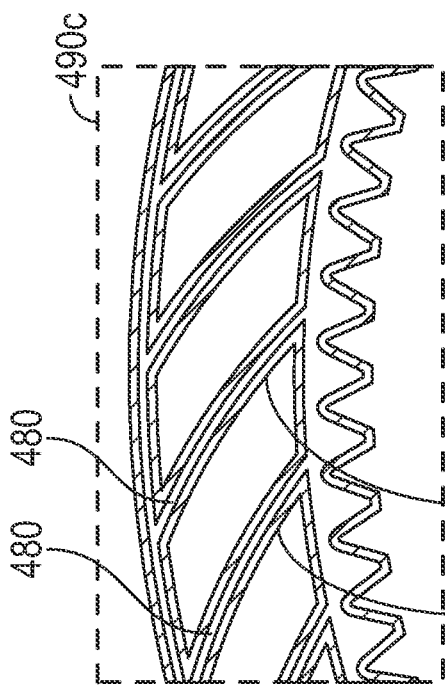
FIG. 8D shows an enlarged, cross-sectional end view of a portion of a hollow gear, according to an embodiment of the present disclosure.
Figure 8E:
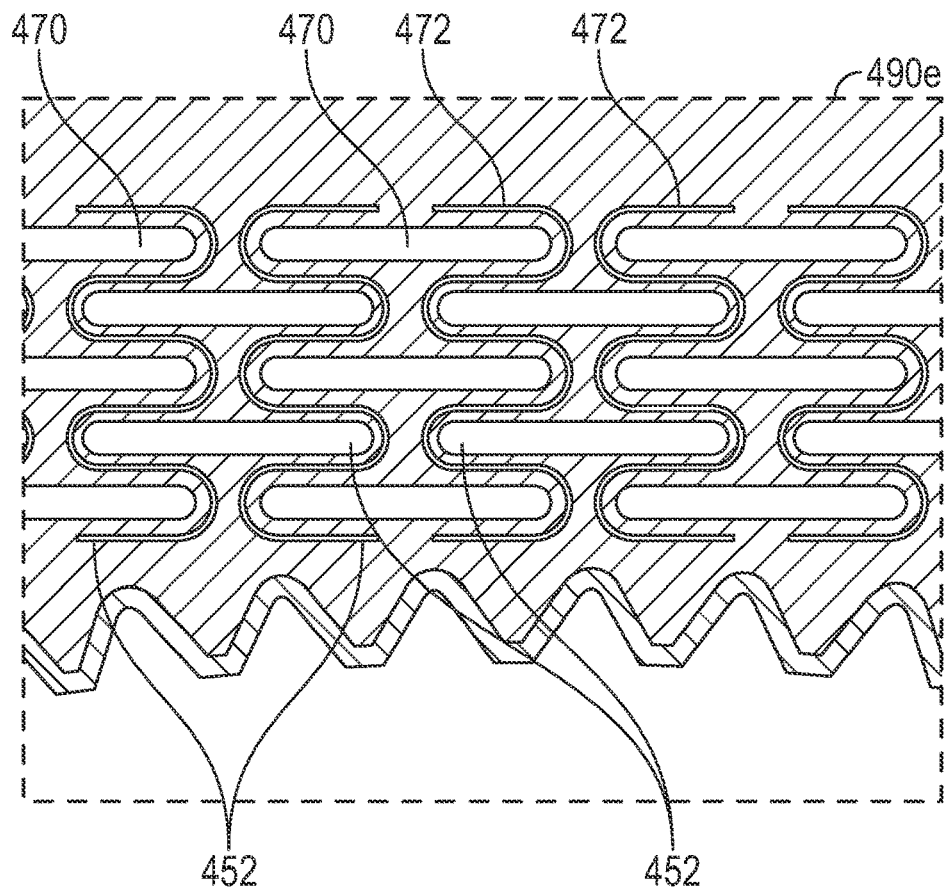
FIG. 8E shows an enlarged, cross-sectional end view of a portion of a hollow gear, according to an embodiment of the present disclosure.
Figure 8F:
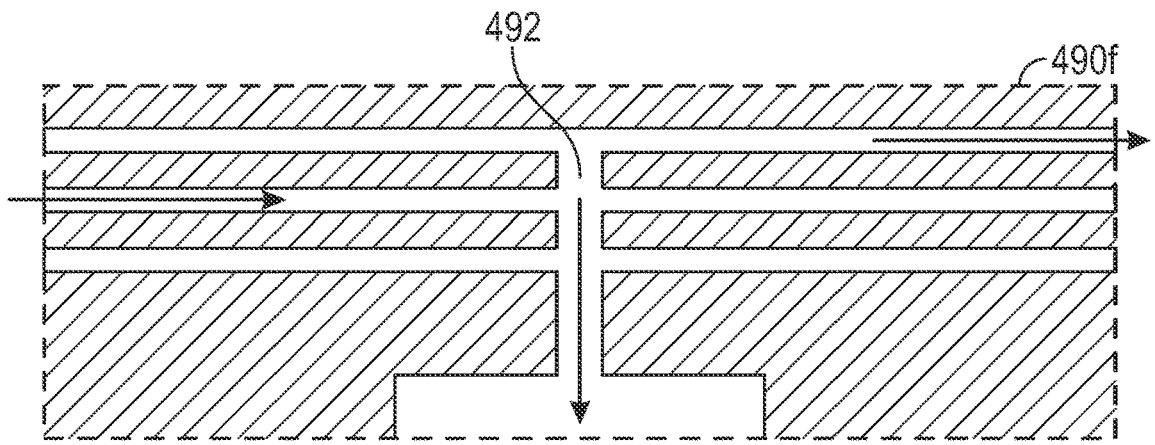
FIG. 8F shows an enlarged, cross-sectional end view of a portion of a hollow gear, according to an embodiment of the present disclosure.
Figure 9:
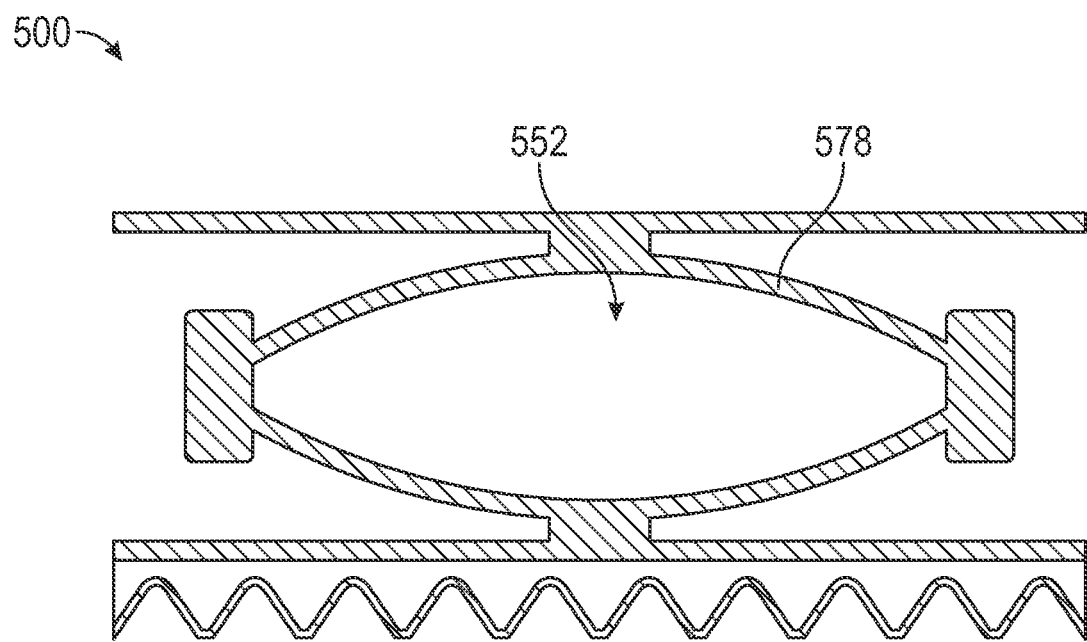
FIG. 9 shows a partial, cross-sectional end view of a portion of a hollow gear, according to an embodiment of the present disclosure.

FIGS. 7 to 9 illustrate schematic views of hollow gears that may be employed for any of the aforementioned hollow gears (e.g., ring gear 144, sun gear 240, and/or planet gears 342). The hollow gears of FIGS. 7 to 9 may include reservoirs and passages as described with respect to FIGS. 4 to 6. The hollow gears of FIGS. 7 to 9 may provide lubricant to the gear meshes as described with respect to FIGS. 4 to 6.

The hollow gears described with respect to FIGS. 7 to 9 may be formed by electroforming, hydroforming, additive manufacturing, or any combination thereof. In some examples, the hollow gears are formed as a single, unitary gear such that there is no bonding and/or fastening thereof. The hollow gears of FIGS. 7 to 9 may include one or more struts that form channels for lubricant to flow therethrough. The hollow gears may also include one or more cavities or reservoirs that store lubricant. The cavities may store lubricant in the case of emergencies (e.g., loss of lubricant supply and/or lubricant interruption). The hollow gears may provide a continuous drip or a supply of lubricant to the gear meshes of the gear assemblies.

FIG. 7 illustrates an axial end view of a hollow gear 400. As mentioned, the hollow gear 400 may be employed as any of the hollow gears previously described, such as, for example, ring gear 244 (FIG. 4), sun gear 240 (FIG. 5), and/or planet gear 342 (FIG. 6). The hollow gear 400 may include a plurality of cavities 452 and a plurality of channels 480. A portion 490 of the hollow gear 400 is shown enlarged in FIGS. 8A to 8F. Although the passages into and out of the hollow gear 400 may not be visible in all views due to the perspective of the views, passages such as those described with respect to FIGS. 4 to 6 may be included in the hollow gear 400.

In FIG. 8A, the portion 490 of FIG. 7 may be a first exemplary portion 490a. The first exemplary portion 490a may include a plurality of struts 478. One or more of the plurality of struts 478 may include a channel 480 such that the first exemplary portion 490a includes a plurality of channels 480. The plurality of channels 480 and/or the cavity 452 may lead to one or more passages extending through the gear teeth (not visible in the cross-sectional view of FIG. 8A). The one or more passages may extend through the gear teeth either through the root, the crest, or any portion therebetween. The one or more passages not visible in FIG. 8A may be akin to the passages 156 and 162 (FIG. 4), the passages 256 and 262 (FIG. 5), and/or the passages 356 and 362 (FIG. 6) such that fluid stored in the cavity 452 and/or passing through the plurality of channels 480 may drip and/or exit to the gear mesh. Although shown as generally "X-shaped," the plurality of struts 478 may take on other shapes and arrangements. One such alternative is shown in FIG. 8C. Lubricant may be provided to the gear teeth and/or the gear mesh via the plurality of cavities 452 and/or the plurality of channels 480.

In FIG. 8B, the portion 490 of FIG. 7 may be a second exemplary portion 490b. The second exemplary portion 490b may be the same as the first exemplary portion 490a. Additionally, the second exemplary portion 490b may include a material 482 in the cavity 452. The material 482 may be a foam, such as a metal foam, that fills the cavity 452. The material 482 may be porous, such as a porous foam or a porous metal foam, such that a lubricant may be stored in the cavity 452. The material 482 may operate as a limiter, that is, the material may be selected to allow a predetermined amount of compression or flexure of the hollow gear, thus, allowing a predetermined amount of impaction absorption.

In FIG. 8C, the portion 490 of FIG. 7 may be a third exemplary portion 490c. The third exemplary portion 490c may include a plurality of struts 476. One or more of the plurality of struts 476 may include the channel 480 such that the third exemplary portion 490c includes a plurality of channels 480. As in the aspect shown in FIG. 8A, the plurality of channels 480 and/or the cavity 452 may lead to one or more passages extending through the gear teeth (not visible in the cross-sectional view of FIG. 8C). The one or more passages may extend through the gear teeth either through the root, the crest, or any portion therebetween. The one or more passages not visible in FIG. 8C may be akin to the passages 156 and 162 (FIG. 4), the passages 256 and 262 (FIG. 5), and/or the passages 356 and 362 (FIG. 6) such that fluid stored in the cavity 452 and/or passing through the plurality of channels 480 may drip and/or exit to the gear mesh. Although shown as generally curved and/or angled struts, the plurality of struts 476 may take on other shapes and arrangements. As in prior examples, lubricant may be provided to the gear teeth and/or the gear mesh via the plurality of cavities 452 and/or the plurality of channels 480.

In FIG. 8D, the portion 490 of FIG. 7 may be a fourth exemplary portion 490d. The fourth exemplary portion 490d may be the same as the third exemplary portion 490c. Additionally, the fourth exemplary portion 490d may include a material 482 in the cavity 452. The material 482 may be a foam, such as a metal foam, that fills the cavity 452. The material 482 may be porous, such as a porous foam or a porous metal foam, such that a lubricant may be stored in the cavity 452.

FIG. 8E illustrates a fifth exemplary portion 490e. The fifth exemplary portion 490e may include a plurality of cavities 452. The plurality of cavities 352 may include a first plurality of pockets 470 and a second plurality of pockets 472. As in prior examples, lubricant may be provided to the gear teeth and/or the gear mesh via the first plurality of pockets 470 and/or the second plurality of pockets 472. As mentioned with respect to prior figures, since the view of FIG. 8E is an axial, end view of the gear, the passages entering and exiting the plurality of pockets are not visible, though they may be present in any of the forms previously described herein.

FIG. 8F illustrates a sixth exemplary portion 490f. The sixth exemplary portion 490f may include an oil circuit 492. The oil circuit 492 may function as a reservoir. The oil circuit 492 may allow lubricant to flow in the direction of the arrows. As in prior examples, lubricant may be provided to the gear teeth and/or the gear mesh via the oil circuit 492.

FIG. 9 illustrates a cross-sectional view of an exemplary hollow gear 500 taken along a radially extending axis of the gear (e.g., a radially extending axis perpendicular to the axis A of FIG. 4). As mentioned, the hollow gear 500 may be employed as any of the hollow gears previously described, such as, for example, ring gear 244 (FIG. 4), sun gear 240 (FIG. 5), and/or planet gear 342 (FIG. 6). The hollow gear 500 may include a cavity 552, also referred to as a reservoir 552. The reservoir 552 may be a circumferentially extending reservoir. That is, the reservoir 552 extends circumferentially around the hollow gear 500 such that an annular cavity is formed by the reservoir 552. This is contrary to the exemplary hollow gear 400 of FIG. 7, which includes a cavity 452 that extends axially from a forward end of the gear to an aft end of the gear to form an axially extending cavity. As mentioned with respect to prior figures, the passages entering and exiting the reservoir 552 are not visible, though they may be present in any of the forms previously described herein.

Referring again to FIG. 9, the hollow gear 500 includes a plurality of struts 578 and a cavity 552. The cavity 552 may be large as compared to the struts 578. This may facilitate carrying of a lubricant three hundred sixty degrees around the circumferential direction of the hollow gear 500. The struts 578 may include a gap therebetween to absorb impact under loading.

Any of the passages or openings described herein may be controlled orifices or passages. The passages or openings may be actively actuated to open and/or close or may be passively actuated to open and/or close. In examples where the passages from the cavity to the gear mesh are passively actuated, the passages may be source controlled passages. That is, the passages may be opened and/or closed based on the load experienced on the respective gear on which the cavity is present (e.g., in FIG. 5, the load on the sun gear 240 controls the opening and/or closing of the passages 256 and/or passages 262). In some examples, the gearbox assemblies may include springs and/or shape memory alloys to effectuate the opening and closing of the passages.

The gear assemblies of the present disclosure may include gears that are formed or made up of hollow sections using electroforming and/or hydroforming. The gears may be lightweight that have flexure connecting features, such as flexible members or struts, to make the gears compliant and to accommodate misalignment of the gears due to the thermal effects, loading, and vibration of the relatively rotating shafts coupled to the gearbox assembly. That is, the struts may be flexible to allow deformation of the gear to accommodate and to correct misalignment between meshing gears. In some examples, the gears include internal cavities that have features to allow for continuous oil supply and dripping. These features may include passages that allow lubricant to flow from the cavities to the gear mesh (e.g., through one or more portions of the gear teeth, through the sides of the gear, and/or through the root of the gear teeth). The lubricant may be stored in cavities for emergency situations (e.g., switching from main to auxiliary oil supply).

In some examples, a metal foam may be included in the cavities of the electroformed gears. The metal foam may be formed to store oil or lubricant and to provide flexure strength. The gear rim may be designed for oil carrier conduits.

The gear assemblies of the present disclosure include hollow gears that provide a dampening system that absorbs vibrations and loading experienced in the gearbox assembly and provides impact resistance due to loading on the gears of the gearbox assembly. The structure of the hollow gear (e.g., struts, members, materials, etc.) also provides impact resistance and impact absorption for loads experienced on the gear. Additionally, the fluid or lubricant within the reservoir acts to cool the hollow gear. That is, rotation of the gears relative to one another and relative to other components in rotational contact causes the gears to be heated. The lubricant or fluid within the reservoir of the hollow gear absorbs the heat (e.g., acting as a heat sink) of the gear, thereby cooling the ring gear.

In examples when the hollow gears are electroformed, the inner core may be removable and/or may be a metal sponge or a foam. In examples when the hollow gears are hydroformed, the gears may have provisions to be welded in order to enclose the volume.

The gearbox assemblies of the present disclosure provide gears that allow for dampening of loads present due to the relative rotation of the gears, allow for continuous and/or emergency lubrication of gear meshes, and accommodate or accounts for misalignment of gear meshes during rotation.

The lubricant of the present disclosure may be oil, grease, a soft lubricant, or any combination thereof. The lubricant of the present disclosure may be energy absorbing to enhance dampening of the gearbox assembly. The lubricant may be present in internal cavities or reservoirs in the hollow gear and may drip through the sides of the gear and/or through the root of the gear teeth to be provided to the gear meshes in the case of emergencies.

The gearbox assemblies of the present disclosure include compliant gears that tolerate misalignment, are lightweight to produce a lightweight gearbox assembly, and are reliable gearbox assemblies.

The gearbox assemblies of the present disclosure may provide both dampening of loads experienced by the rotating gears and internal cooling of the hollow gear. For example, as shown in the examples of FIGS. 7 to 9, the hollow gears include both stored oil cavities (e.g., cavities 452) and flowing oil cavities (e.g., channels 480). Thus, the struts (e.g., struts 476) may provide dampening, but this dampening is enhanced when oil or lubricant is added to the stored and flowing oil cavities. Furthermore, the stored and flowing oil provides cooling from an internal portion of the hollow gear. The gear mesh generate heat during rotation and meshing with the adjacent gears. The oil provided to the gear mesh provides cooling. The internal static and flowing lubricant in the hollow gears also acts as cooling. Thus, the gears may be cooled at the surface (e.g., cooling over the gear mesh) and internally (e.g., due to the cavities therein).

Further aspects of the present disclosure are provided by the subject matter of the following clauses.

According to an aspect of the disclosure, a gearbox assembly for a gas turbine engine includes a hollow gear having one or more reservoirs configured to store a lubricant and one or more passages configured to supply the lubricant to one or more gear meshes in the gearbox assembly. The hollow gear provides a dampening system configured to absorb vibrations and loading experienced in the gearbox assembly, provides impact resistance for the gearbox assembly, and provides internal cooling of the hollow gear.

The gearbox assembly of the preceding clause, wherein the hollow gear is configured to accommodate misalignment of one or more gears within the gearbox assembly.

The gearbox assembly of any preceding clause, wherein the one or more reservoirs extend axially from a forward end of the hollow gear to an aft end of the hollow gear, thus, forming an axially extending cavity.

The gearbox assembly of any preceding clause, wherein the one or more reservoirs extend circumferentially around the hollow gear such that an annular cavity is formed by the one or more reservoirs.

The gearbox assembly of any preceding clause, further comprising a metal foam in the one or more reservoirs, the metal foam configured to store the lubricant and to provide flexure strength to the hollow gear.

The gearbox assembly of any preceding clause, wherein the one or more passages are passive controlled to open and close based on a load experienced by the hollow gear.

The gearbox assembly of any preceding clause, wherein the one or more passages are formed in one or more struts of the hollow gear, the one or more struts being flexure members configured to allow deflection of the hollow gear.

The gearbox assembly of any preceding clause, wherein the hollow gear is formed from electroforming, hydroforming, additive manufacturing, or combinations thereof.

The gearbox assembly of any preceding clause, wherein the gearbox assembly is configured to connect a low-pressure shaft of the gas turbine engine and a fan rotor linkage of the gas turbine engine.

The gearbox assembly of any preceding clause, wherein the lubricant is supplied to a gear mesh between adjacent relatively rotating gears of the gearbox assembly through sides of the hollow gear or through a root of gear teeth of the hollow gear.

The gearbox assembly of any preceding clause, further comprising a sun gear, a plurality of planet gears, and a ring gear.

The gearbox assembly of any preceding clause, wherein the hollow gear is the sun gear, and the plurality of planet gears are fixed to a stationary planet carrier.

The gearbox assembly of any preceding clause, wherein the hollow gear is the ring gear, the ring gear being fixedly coupled via linkages to a stationary support structure.

The gearbox assembly of any preceding clause, wherein the hollow gear is at least one planet gear of the plurality of planet gears, the plurality of planet gears being fixed to a stationary planet carrier.

According to an aspect of the present disclosure, a hollow gear for a gearbox assembly of a gas turbine engine includes one or more reservoirs configured to store a lubricant, one or more passages configured to supply the lubricant to one or more gear meshes in the gearbox assembly, and a dampening system configured to absorb vibrations and loading experienced in the gearbox assembly and configured to provide impact resistance for the gearbox assembly.

The hollow gear of the preceding clause, wherein the one or more reservoirs extend axially from a forward end of the hollow gear to an aft end of the hollow gear, thus, forming an axially extending cavity.

The hollow gear of any preceding clause, wherein the one or more reservoirs extend circumferentially around the hollow gear such that an annular cavity is formed by the one or more reservoirs.

The hollow gear of any preceding clause, further comprising a metal foam in the one or more reservoirs, the metal foam configured to store the lubricant and to provide flexure strength to the hollow gear.

The hollow gear of any preceding clause, wherein the one or more passages are formed in one or more struts of the hollow gear, the one or more struts being flexure members configured to allow deflection of the hollow gear.

The hollow gear of any preceding clause, wherein the hollow gear is a sun gear, one or more planet gears of a plurality of planet gears, or a ring gear.

Although the foregoing description is directed to the preferred embodiments, it is noted that other variations and modifications will be apparent to those skilled in the art, and may be made without departing from the spirit or the scope of the disclosure. Moreover, features described in connection with one embodiment may be used in conjunction with other embodiments, even if not explicitly stated above.

The invention claimed is:

1. A gearbox assembly for a gas turbine engine, the gearbox assembly comprising:
    a hollow gear having:
        (a) one or more reservoirs configured to store a lubricant; and
        (b) one or more passages configured to supply the lubricant to one or more gear meshes in the gearbox assembly,
    wherein the hollow gear is configured to absorb vibrations and loading experienced in the gearbox assembly, to provide impact resistance for the gearbox assembly, and to provide internal cooling of the hollow gear, and
    wherein the one or more passages are formed in one or more struts of the hollow gear, the one or more struts being flexure members configured to allow deflection of the hollow gear.

2. The gearbox assembly of claim 1, wherein the hollow gear is configured to accommodate misalignment of one or more gears within the gearbox assembly.

3. The gearbox assembly of claim 1, wherein the one or more reservoirs extend axially from a forward end of the hollow gear to an aft end of the hollow gear, thus, forming an axially extending cavity.

4. The gearbox assembly of claim 1, further comprising a metal foam in the one or more reservoirs, the metal foam configured to store the lubricant and to provide flexure strength to the hollow gear.

5. The gearbox assembly of claim 1, wherein the one or more passages are passively controlled to open and close based on a load experienced by the hollow gear.

6. The gearbox assembly of claim 1, wherein the hollow gear is formed from electroforming, hydroforming, additive manufacturing, or combinations thereof.

7. The gearbox assembly of claim 1, wherein the gearbox assembly is configured to connect a low-pressure shaft of the gas turbine engine and a fan rotor linkage of the gas turbine engine.

8. The gearbox assembly of claim 1, wherein the lubricant is supplied to a gear mesh between adjacent relatively rotating gears of the gearbox assembly through sides of the hollow gear or through a root of gear teeth of the hollow gear.

9. The gearbox assembly of claim 1, further comprising a sun gear, a plurality of planet gears, and a ring gear.

10. The gearbox assembly of claim 9, wherein the hollow gear is the sun gear, and the plurality of planet gears are fixed to a stationary planet carrier.

11. The gearbox assembly of claim 9, wherein the hollow gear is the ring gear, the ring gear being fixedly coupled via linkages to a stationary support structure.

12. The gearbox assembly of claim 9, wherein the hollow gear is at least one planet gear of the plurality of planet gears, the plurality of planet gears being fixed to a stationary planet carrier.

13. A hollow gear for a gearbox assembly of a gas turbine engine, the hollow gear comprising:
    (a) one or more reservoirs configured to store a lubricant; and
    (b) one or more passages configured to supply the lubricant to one or more gear meshes in the gearbox assembly,
    wherein the hollow gear is configured to absorb vibrations and loading experienced in the gearbox assembly and is configured to provide impact resistance for the gearbox assembly, and
    wherein the one or more passages are formed in one or more struts of the hollow gear, the one or more struts being flexure members configured to allow deflection of the hollow gear.

14. The hollow gear of claim 13, wherein the one or more reservoirs extend axially from a forward end of the hollow gear to an aft end of the hollow gear, thus, forming an axially extending cavity.

15. The hollow gear of claim 13, further comprising a metal foam in the one or more reservoirs, the metal foam configured to store the lubricant and to provide flexure strength to the hollow gear.

16. The hollow gear of claim 13, wherein the hollow gear is a sun gear, one or more planet gears of a plurality of planet gears, or a ring gear.

* * * * *